Sept. 27, 1932.  M. J. FRAMBACH ET AL  1,879,161
FISH MOUTH SPREADER
Filed June 4, 1931
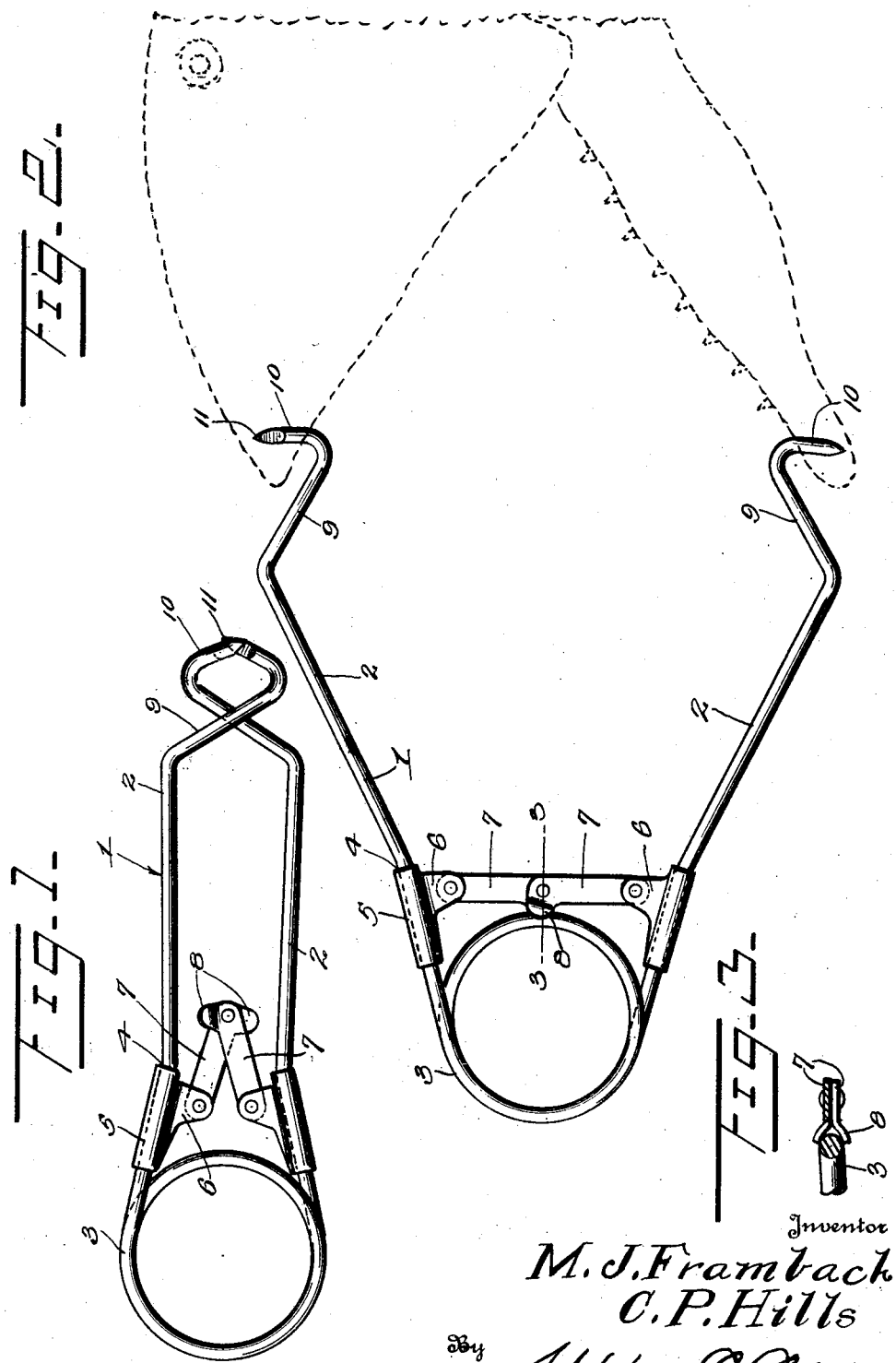
Inventor
M. J. Frambach
C. P. Hills
By Watson E. Coleman Patented Sept. 27, 1932

1,879,161

UNITED STATES PATENT OFFICE

MATHEW J. FRAMBACH AND CHARLES P. HILLS, OF HARTLEY, IOWA

FISH MOUTH SPREADER

Application filed June 4, 1931. Serial No. 542,119.

This invention relates to devices for fishermen's use and pertains particularly to a fish mouth holder.

The primary object of the present invention is to provide a spring pressed device which may be readily inserted into the mouth of a fish, when released, will force the fish's mouth open and retain it in this position so that the hook may be readily removed therefrom without danger of the fisherman being bitten by the fish.

Another object of the invention is to provide a device for holding open the mouth of a fish, which has a locking means associated therewith whereby the fish will be prevented from forcing together the elements engaging its jaws, which elements are normally held in spaced relation by a spring element.

A still further object of the invention is to provide a device of the above described character having two pointed arms connected by an integral spring member, which arms are so designed that they may be locked in engaged relation at their tips, in which condition the device may be readily placed in a carrying bag or in the pocket without danger to the carrier, or the pointed ends may be readily inserted into the mouth of the fish before being disengaged.

Other objects and advantages of the present invention will become apparent as the description of the same proceeds, and the invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:

Figure 1 shows the device embodying the present invention in side elevation and in closed position.

Figure 2 shows the device in open position with the pointed ends thereof in engagement with the jaws of a fish, the latter being shown in dotted outline.

Figure 3 is a sectional view taken on the line 3—3 of Figure 2.

Referring more particularly to the drawing, wherein like numerals of reference indicate corresponding parts throughout the several views, the numeral 1 indicates generally the fish mouth holding device embodying the present invention which, as shown, consists of two relatively long arms, each of which is indicated by the numeral 2, which are integrally connected through the medium of a coil spring member 3, the ends of which merge into the inner ends of the arms 2, as illustrated.

Adjacent the point of connection between the inner ends of the arms 2 and the ends of the convolutions of the spring 3, the arms are bent outwardly slightly, as indicated at 4, and inwardly of these bends the arms carry the sleeves 5, each of which has extending inwardly therefrom an apertured ear 6. These ears 6 are in opposed relation between the inner ends of the arms and are connected by the toggle links 7. Each of these links 7, where they are connected together, has a laterally directed ear 8 and these ears coact to straddle the adjacent convolution of the spring 3 when the arms 2 are in the spaced relation shown in Figure 2 and when the links are in longitudinal alignment to maintain the arms in the opened out position shown.

The outer end of each arm 2 has an inwardly obliquely directed portion 9, which terminates in a reversely directed tip 10 which is provided with the flat sharp point 11. These tips 10 are substantially in alignment when the arms 2 are opened or separated and extend substantially at right angles to the longitudinal axis of the device.

When the device is not in use the arms 2 are forced together against the tension of the spring 3, the toggles 7, of course, being moved from the aligned position in which they are shown in Figure 2 to the angular positions in which they are shown in Figure 1 and the obliquely angled outer ends 9 of the arms are forced into overlapping relation until the pointed tips 10 pass one another so that, when the device is again permitted to open slightly, these tips, which are turned slightly laterally from the plane in which the adjacent arms 2 and portions 9 lie, will snap into the overlapping relation shown in Figure 1 with the flattened faces of the points pressing together.

In this manner the points will be protected and they will be prevented from catching in the clothing or with other articles if the device is placed in a satchel. It will also be readily seen that with the tips engaged with one another in the manner shown in Figure 1 they may be readily inserted in the mouth of the fish and then released by compressing the arms and shifting them slightly away from one another. The spring 3, which is always under tension will then swing the arms apart and force the mouth of the fish open in the manner illustrated and if the fish is of a large strong type the toggle arms 7 may be snapped down to the point where they are in alignment and where the ears 8 engage over the convolution of the adjacent spring so as to act as a brace to retain the arms in open position.

While the present device has been illustrated as having means for retaining the arms in spaced or opened position, it is, of course, to be understood that for small types of fish this means is not essential as the spring 3 may be made of sufficient strength to prevent the fish forcing the arms together.

The sleeves 5 may be secured to the arms 2 in any suitable manner to prevent their movement thereon as, for example, they may be spot welded, countersunk or sweated onto the arms.

Having thus described the invention, what is claimed is:

1. A device of the character described, comprising a pair of arm members, a coil spring having each arm extending as a continuation of one end thereof, said spring normally acting to move the free ends of said arms apart, an obliquely inwardly directed portion formed at the free end of each arm, an outwardly directed tip formed at the free end of each of said portions, and a point formed at the end of each of said tips.

2. A device of the character described, comprising a pair of arm members, a coil spring having each arm forming an integral continuation of one end thereof, said spring normally acting to move the free ends of said arms apart, an obliquely inwardly directed portion formed at the free end of each arm, an outwardly directed tip formed at the free end of each of said portions, a point formed at the end of each of said tips, and means for securing said arms in separated condition.

3. A device of the character described, comprising a pair of arm members, a coil spring having each arm forming an integral continuation of one end thereof, said spring normally acting to move the free ends of said arms apart, an obliquely inwardly directed portion formed at the free end of each arm, an outwardly directed tip formed at the free end of each of said portions, a point formed at the end of each of said tips, and a pair of pivotally connected toggle members connected between said arms adjacent their inner ends to maintain the arms in separated condition.

4. A device of the character described, comprising a pair of arm members, a coil spring having each arm forming an integral continuation of one end thereof, said spring normally acting to move the free ends of said arms apart, an obliquely inwardly directed portion formed at the free end of each arm, an outwardly directed tip formed at the free end of each of said portions, a point formed at the end of each of said tips, a pair of pivotally connected toggle members connected between said arms adjacent their inner ends to maintain the arms in separated condition, and ear members carried by said toggle members arranged to straddle the said spring when the toggles are in longitudinal alignment.

5. A device of the character described, comprising a coil spring, a pair of arms each extending from and forming a continuation of one end of said spring, said spring normally acting to swing said arms apart into diverging relation, an obliquely directed terminal forming a part of the free end of each arm, and a point forming the tip of each terminal, each of said points being formed by the cutting of each terminal obliquely at the end, the faces of said oblique cuts being oppositely directed whereby upon arranging said arms in crossed relation they may be abutted one with the other to retain the arms together.

In testimony whereof we hereunto affix our signatures.

MATHEW J. FRAMBACH.
CHARLES P. HILLS.